(12) United States Patent  (10) Patent No.: US 8,929,235 B2
Baldemair et al.  (45) Date of Patent: Jan. 6, 2015

(54) CONTROLLING CSI REPORTING IN A LTE CELLULAR COMMUNICATION NETWORK

(75) Inventors: Robert Baldemair, Solna (SE); Bo Hagerman, Tyresö (SE); George Jöngren, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 275 days.

(21) Appl. No.: 13/379,767

(22) PCT Filed: Apr. 9, 2010

(86) PCT No.: PCT/SE2010/050390
§ 371 (c)(1),
(2), (4) Date: Dec. 21, 2011

(87) PCT Pub. No.: WO2011/002389
PCT Pub. Date: Jan. 6, 2011

(65) Prior Publication Data
US 2012/0092989 A1    Apr. 19, 2012

Related U.S. Application Data

(60) Provisional application No. 61/221,736, filed on Jun. 30, 9.

(51) Int. Cl.
*H04L 12/26* (2006.01)
*H04W 24/10* (2009.01)
*H04W 72/12* (2009.01)

(52) U.S. Cl.
CPC .......... *H04W 24/10* (2013.01); *H04W 72/1268* (2013.01)
USPC ............................ 370/252; 370/329; 455/450

(58) Field of Classification Search
None
See application file for complete search history.

(56) References Cited

U.S. PATENT DOCUMENTS

| 8,588,102 | B2 | 11/2013 | Hoshino et al. | |
| 2007/0230373 | A1* | 10/2007 | Li et al. | 370/267 |
| 2008/0214198 | A1* | 9/2008 | Chen et al. | 455/450 |
| 2009/0147728 | A1 | 6/2009 | Atia et al. | |
| 2009/0147869 | A1* | 6/2009 | Duan et al. | 375/260 |
| 2010/0197316 | A1* | 8/2010 | Aoyama et al. | 455/452.1 |
| 2011/0065445 | A1* | 3/2011 | Moulsley | 455/452.1 |
| 2011/0237270 | A1* | 9/2011 | Noh et al. | 455/450 |

FOREIGN PATENT DOCUMENTS

| WO | WO2007023515 | * | 3/2007 |
| WO | WO2008155910 | * | 6/2008 |
| WO | WO 2010/140298 A1 | | 12/2010 |

OTHER PUBLICATIONS

"LTE; Evolved Universal Terrestrial Radio Access (E-UTRA); Physical layer procedures (3GPP TS 36.213 version 8.7.0 Release 8)", ETSI TS 136 213 V8.7.0, Jun. 2009, 79 pages.

(Continued)

*Primary Examiner* — Mohammad Adhami
(74) *Attorney, Agent, or Firm* — Myers Bigel Sibley & Sajovec, P.A.

(57) ABSTRACT

The object of the present invention is to distribute the transmission of the CSI (Channel state information) reports among the different UEs, wherein the CSI reports are based on measurements on cell specific reference signals from the base station. This is achieved in a LTE cellular communication network by controlling the transmission of CSI reports from the UEs.

24 Claims, 5 Drawing Sheets

(56) References Cited

OTHER PUBLICATIONS

"Universal Mobile Telecommunications System (UMTS); LTE; Feasibility study for evolved Universal Terrestrial Radio Access Network (UTRAN) (3GPP TR 25.912 version 8.0.0 Release 8); ETSI TR 125 912", vol. 3-R, No. V8.0.0, Jan. 2009, 66 pages.

3GPP, "3GPP TS 36.214: Technical Specification Group Radio Access Network; Evolved Universal Terrestrial Radio Access (E-UTRA); Physical layer—Measurements", vol. 36.214, No. V8.1.0, Nov. 2007, 9 pages.

Alcatel-Lucent "CQI Feedback Agreements and Proposals", 3GPP TSG-RAN#59 WG 2 LTE, R2-073144, Aug. 20-24, 2007, 5 pages.

International Search Report Corresponding to International Application No. PCT/SE2010/050390; Date of Mailing: Jul. 27, 2010; 2 pages.

Summary of Japanese Office Action Issued Mar. 4, 2014, 1 page.

Chinese Office Action (Foreign Text 7 pages, English Translation 12 pages) corresponding to Chinese Patent Application No. 201080030326.9; Issue Date: Dec. 30, 2013.

Ericsson, "CQI Feedback Agreements and Proposals", 3GPP TSG-RAN #59 WG 2 LTE, 2-073144, Athens, Aug. 20-Aug. 24, 2007, 5 pages.

3GPP TR 25.912 V8.0.0 (Dec. 2008); ,3$^{rd}$ Generation Partnership Project; Technical Specification Group Radio Access Network; Feasibility study for evolved Universal Terrestrial Radio Access (UTRA) and Universal Terrestrial Radio Access Network (UTRAN) (Release 8), Sophia-Antipolis Valbonne, France, Dec. 2008.

3GPP TS 36.213 V8.3.0; 3$^{rd}$ Generation Partnership Project; Technical Specification Group Radio Access Network; Evolved Universal Terrestrial Radio Access (E-UTRA); Physical layer procedures (Release 8); Valbonne, France, May 2008, 46 pages.

\* cited by examiner

CONTROLLING CSI REPORTING IN A LTE CELLULAR COMMUNICATION NETWORK

CROSS REFERENCE TO RELATED APPLICATIONS

This application is a 35 U.S.C. §371 national stage application of PCT International Application No. PCT/SE2010/050390, filed on 9 Apr. 2010, which claims the benefit of priority of U.S. Provisional Application No. 61/221,736, filed 30 Jun. 2009. The above-referenced PCT International Application was published in the English language as International Publication No. WO 2011/002389 on 6 Jan. 2011. The disclosures of both of the above referenced applications are hereby incorporated herein in their entireties by reference.

BACKGROUND

In modern wireless communication systems like Long Term Evolution (LTE), the base station determines the used transport format, transport block size, MCS scheme, MIMO transmission mode, etc for both downlink (DL) and uplink (UL). To be able to do this determination for the DL the base station requires information from the terminal regarding properties of the current DL channel, commonly referred to as Channel State Information (CSI). In LTE Release-8, CSI consist of Channel Quality Information (CQI), Precoder Matrix Index (PMI), and Rank Indicator (RI). In later releases other forms of CSI may also be possible such as explicit channel quantization, effective channel quantization including receiver processing, noise plus interference feedback as well as receive covariance feedback. To enable such measurement reports the terminal measures on DL Reference Signals (RS). In LTE Release-8 the used RS are cell specific and transmitted frequently.

In LTE-Advanced i.e. Release-10 and beyond, cell specific RS used for CSI estimation are less frequently transmitted since demodulation of downlink transmission in many transmission modes is supposedly based on UE specific RS. However, determination of CSI is still based on cell specific RS—which are now less frequently transmitted to maintain or even reduce the total RS overhead.

Since the cell specific RS used for CSI measurements are sent less frequently, the UEs have a reduced amount of cell specific RS to choose from when they are requested to measure the CSI. This results in that many UEs will send the CSI reports in the same subframe risking congestion in the uplink.

SUMMARY

An object of embodiments of the present invention is to avoid uplink congestion caused by the transmission of CSI reports.

This is achieved by distributing the transmission of the CSI reports among different UEs. The distribution may be performed by sending a transmission pattern to the UE wherein the transmission pattern indicates to the UE when it should send the CSI reports. The transmission patterns for the UEs in a cell are co-coordinated such that the CSI reports from different UEs do not collide. Another way to distribute the CSI reports among the UEs is to send dedicated commands to the UEs indicating that the UEs should send a CSI report and the UEs then send a CSI report after a time delay calculated from the reception of the command. The distribution of the CSI reports may in this case be accomplished by distributing the commands. Yet another way to distribute the CSI reports among the UEs is to use a UE specific parameter known both at the base station and the UEs and to use this UE-specific parameter when determining when to send the CSI reports.

According to first aspect of the present invention, a method in a base station in a LTE cellular communication network for controlling CSI reports to be sent by a UE is provided. The CSI reports are based on measurements on cell specific reference signals from the base station. In the method, an interval/pattern with which the cell specific reference signals should be sent from the base station is determined and a parameter dependent on the interval/pattern which is indicative of when the UE should send CSI reports is determined to distribute CSI reports from different UEs.

According to a second aspect of the present invention, a method in a UE in a LTE cellular communication network for sending CSI reports is provided. The CSI reports are based on measurements on cell specific reference signals from a base station, and the cell specific reference signals are sent with a predefined interval/pattern. In the method, a parameter is used, wherein the parameter is dependent on the interval/pattern and is indicative of when the UE should send CSI reports, and the CSI reports are sent according to the parameter.

According to a third aspect of the present invention, a base station adapted for a LTE cellular communication network for controlling CSI reports to be sent by a UE is provided. The CSI reports are based on measurements on cell specific reference signals from the base station. The base station comprises a first processing unit 501 for determining an interval/pattern with which the cell specific reference signals should be sent from the base station, and a second processing unit 502 for determining a parameter dependent on the interval/pattern which is indicative of when the UE should send CSI reports to distribute CSI reports from different UEs.

According to a fourth aspect of the present invention a UE adapted for a LTE cellular communication network for sending CSI reports is provided. The CSI reports are based on measurements on cell specific reference signals from a base station and the cell specific reference signals are sent with a predefined interval/pattern. The UE comprises a CSI reporting manager 601 configured to use a parameter, wherein the parameter is dependent on the interval/pattern and is indicative of when the UE should send CSI reports. The UE further comprises a transmitter 602 for sending the CSI reports according to the parameter.

An advantage with embodiments of the present invention is that CSI reports are distributed across many uplink subframes thus offloading those uplink subframes that would be used in case of a fixed reporting delay. In case the reporting is done on PUCCH less resource blocks must be set aside for PUCCH format 2 increasing the resources available for PUSCH.

DETAILED DESCRIPTION

Figure 1:
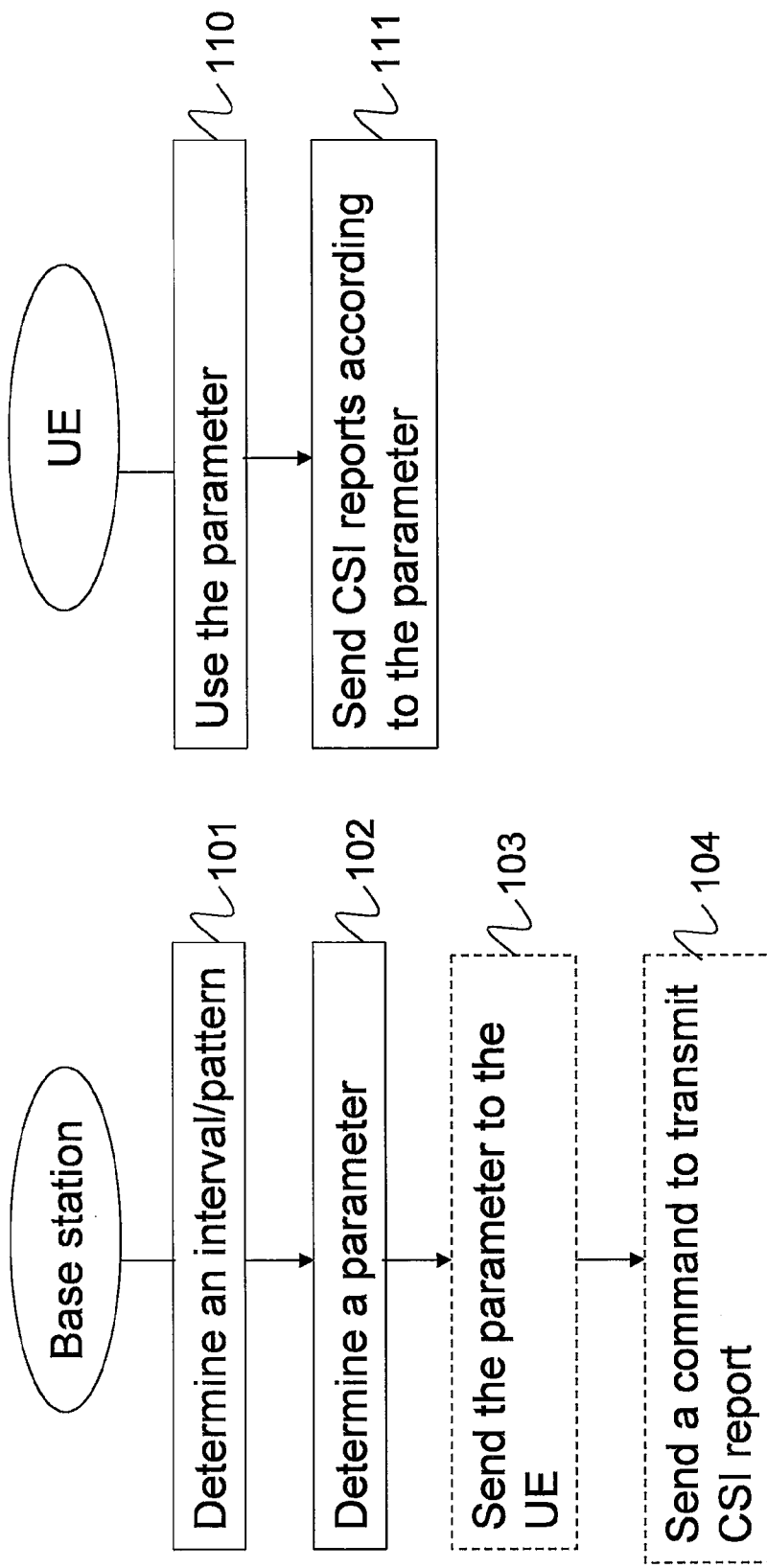
FIG. 1 is a flowchart of the methods according to embodiments of the present invention.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the present invention is primarily described in the form of methods and devices, the invention may also be embodied in a computer program product as well as a system comprising a computer processor and a memory coupled to the processor, wherein the memory is encoded with one or more programs that may perform the functions disclosed herein.

The basic idea of the present invention is to distribute the transmission of the CSI reports among the different UEs, wherein the CSI reports are based on measurements on cell specific reference signals from the base station. This is achieved in a LTE cellular communication network by controlling the transmission of CSI reports from the UEs. As illustrated in FIG. 1, it is first determined 101 in the base station an interval with which the cell specific reference signals should be sent from the base station. I.e. the interval is the time between the transmissions of two subsequent reference signals. In case of more complicated reference signal transmission pattern (e.g. not completely periodic transmission patterns) the transmission pattern is not completely described by a single interval value. A parameter is then determined 102, dependent on the interval, which is indicative of when the UE should send CSI reports to distribute CSI reports from different UEs. The parameter is made dependent on the interval since the base station should not request CSI reports at a higher frequency than the transmission frequency of the reference signals.

Accordingly, the UE is using 110 said parameter, and the UE is sending 111 the CSI reports according to the parameter as shown in FIG. 1.

According to a first and a second embodiment, the parameter indicative of when the UE should send CSI reports is sent 103 from the base station to the UE.

Figure 2:
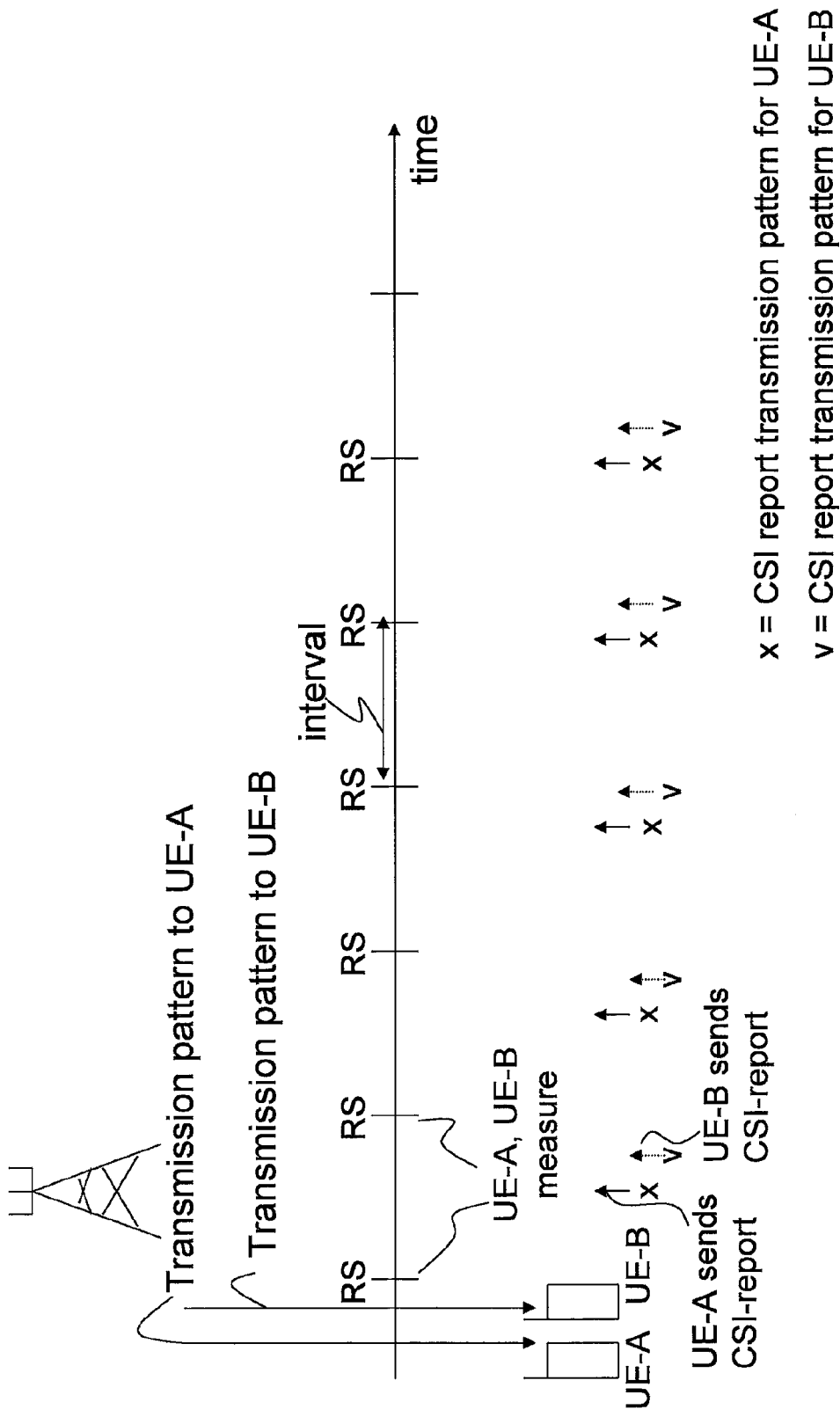
FIG. 2 illustrates the first embodiment of the present invention.

In the first embodiment, the parameter indicative of when the UE should send CSI reports represents a transmission pattern. The specific transmission pattern is sent dedicated from the base station to each UE which indicates when each UE should send the CSI reports as illustrated in FIG. 2. Alternatively UEs can be grouped and the same transmission pattern is sent to the group of UEs. The transmission pattern may comprise one absolute time instance and a reporting period. In case of more complicated CSI report transmission pattern (e.g. not completely periodic CSI report transmission patterns) the CSI report transmission pattern is not completely described by one absolute time instance and a reporting period.

Figure 3:
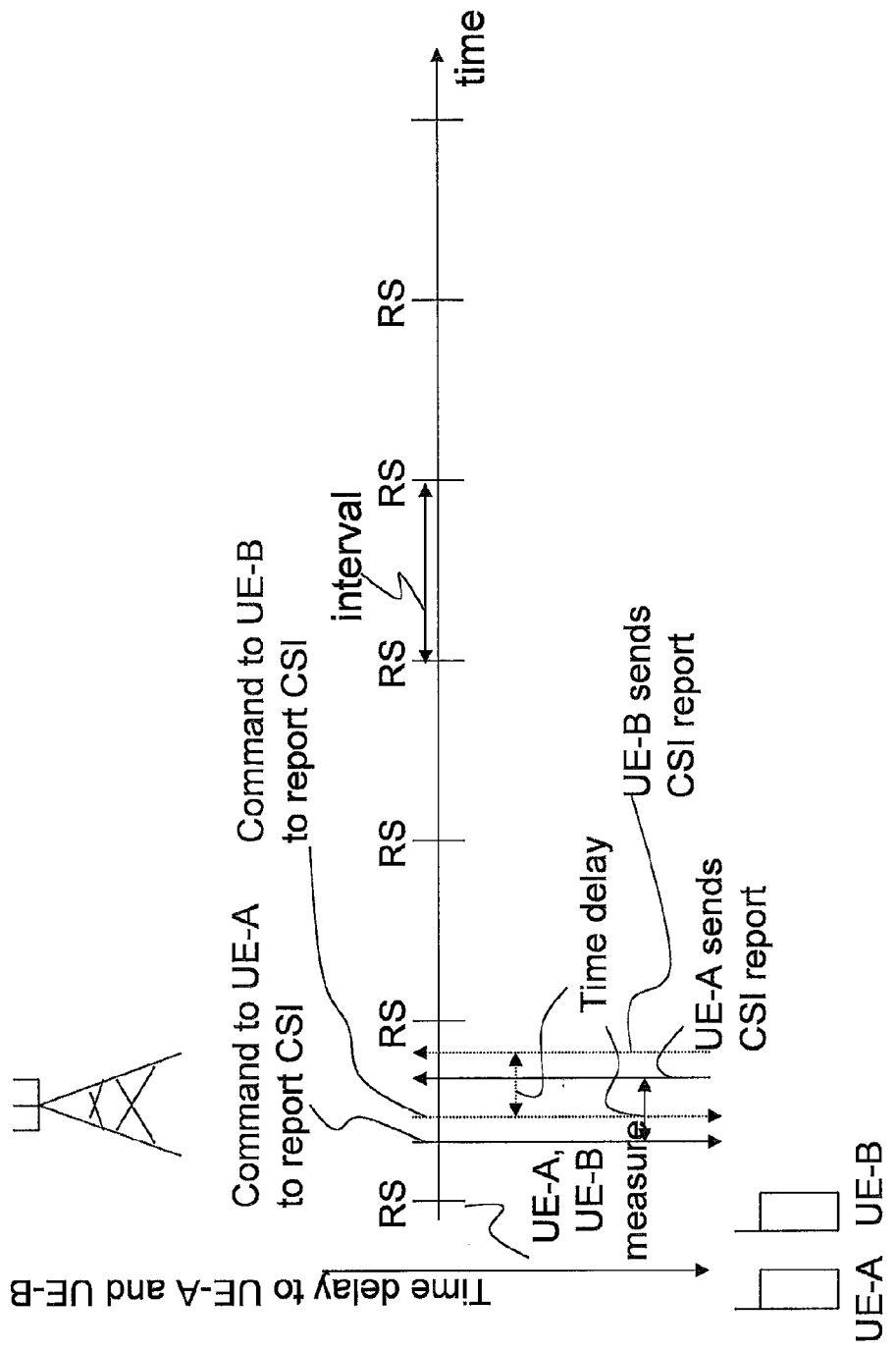
FIG. 3 illustrates the second embodiment of the present invention.

In the second embodiment, the parameter indicative of when the UE should send CSI reports represents a time delay. This time delay is the delay from which the UE receives a command to send the CSI report until the UE transmits the CSI report as illustrated in FIG. 3. In this case, signaling is used to semi-statically configure the reporting delay using e.g. higher layer signaling such as RRC. When the CSI reporting is triggered by a dedicated request to send a CSI report, that dedicated request may be signaled as part of the PDCCH, and could also include the reporting time delay or the subframe number which should be used for reporting.

According to a first alternative of the second embodiment which is illustrated in FIG. 3, the commands to send CSI reports from the base station to the UEs are sent dedicated to each UE. Thus the distribution of the transmission of the CSI reports among the different UEs is accomplished by distributing the commands from the base station to send CSI reports. The information of the time delay for each UE may be sent dedicated or broadcasted. In addition, the time delay may be identical for all UEs or differ among the UEs as long as the transmissions of the CSI reports do not collide with each other.

According to a second alternative of the second embodiment, a common command/pattern to send CSI reports are broadcasted to all UEs and the UEs receives individual time delays to be calculated from the reception of the common command. The individual time delays may either be sent dedicated to the UEs or all individual time delays may be broadcasted to all UEs. This alternative is not illustrated in FIG. 3.

Figure 4:
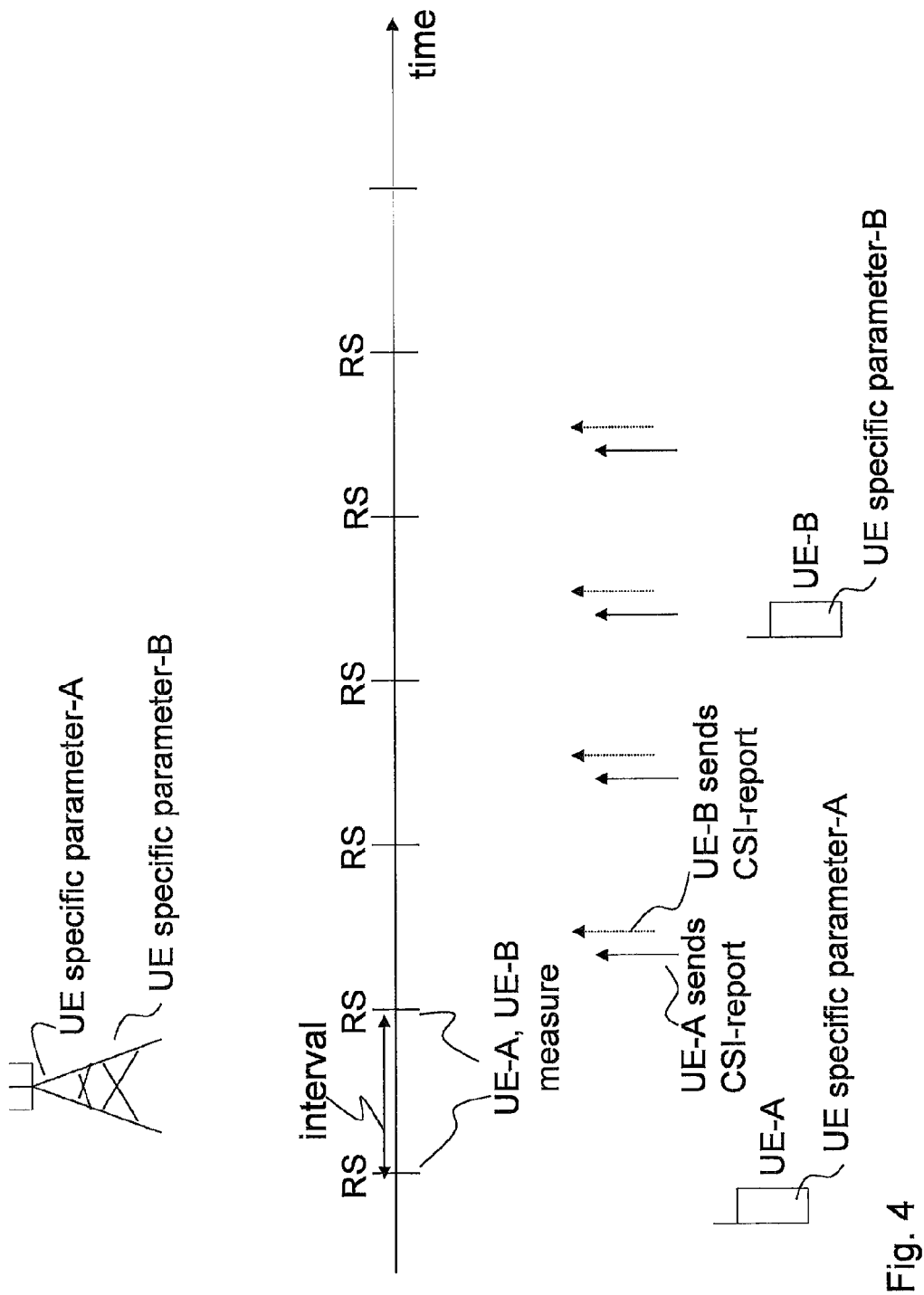
FIG. 4 illustrates the third embodiment of the present invention.

In the third embodiment, the parameter indicative of when the UE should send CSI reports is a parameter known by both the base station and the UEs. The parameter is specified by a protocol such that both the base station and the UE know that this parameter indicates when the UE should send CSI reports. In this embodiment, no information is sent to the UEs as illustrated in FIG. 4. An example of a parameter which can be used for this purpose is the C-RNTI. For example, if L different reporting transmission times/pattern should be used the UE could calculate i=mod(CRNTI,L) and i is then an index to one of the L reporting transmission times. Other common parameters and mappings can be envisioned as well. It should be noted that the base station needs to be aware of the parameter since the base station has to know when it should expect the CSI reports from the UE.

Figure 5:
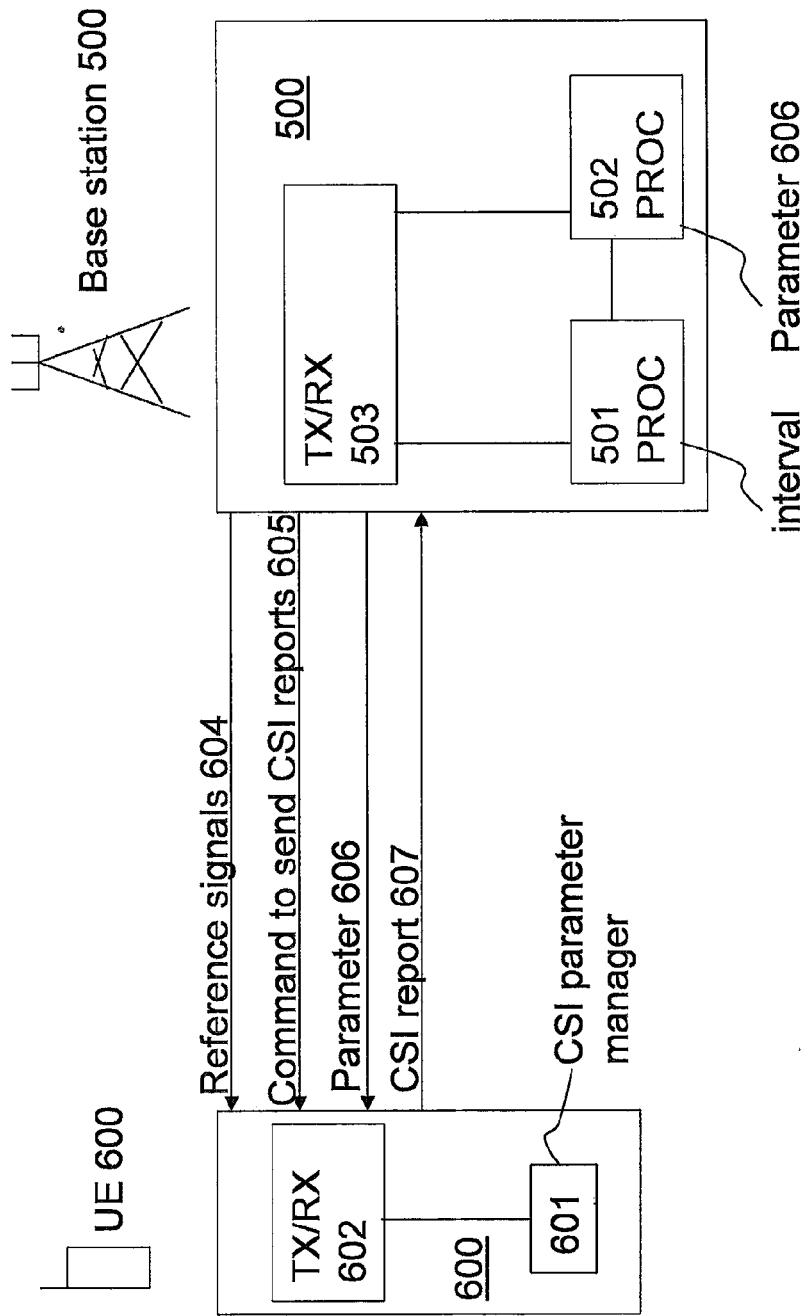
FIG. 5 illustrates a base station and a UE according to embodiments of the present invention.

Turning now to FIG. 5 showing a base station 500 adapted for a LTE cellular communication network for controlling CSI reports to be sent by a UE. The base station is configured to transmit cell specific reference signals 604. The UE measures on these reference signals and the CSI reports 607 are based on these measurements. According to embodiments of the present invention, the base station comprises a first processing unit 501 for determining an interval with which the cell specific reference signals should be sent from the base station and a second processing unit 502 for determining a parameter dependent on the interval which is indicative of when the UE should send CSI reports to distribute CSI reports from different UEs.

A UE 600 is also shown in FIG. 5. The UE 600 is adapted for LTE cellular communication network. Thus the UE 600 is configured to measure on cell specific reference signals 604 which are sent with a predetermined interval. It should be noted that the interval is shown in FIGS. 2-4. The UE 600 comprises a CSI reporting manager 601 configured to use a parameter 606, wherein the parameter 606 is dependent on the predetermined interval and is indicative of when the UE should send CSI reports. The UE further comprises a transmitter 602 for sending the CSI reports 607 according to the parameter 606.

According to the first and second embodiments, the base station 500 comprises a transmitter 503 adapted to send the parameter 606 indicative of when the UE should send CSI reports 607 to the UE. The UE 600 comprises accordingly a receiver 602 for receiving the parameter 606 from the base station 500.

As mentioned above, the parameter is according to the first embodiment a transmission pattern indicative of when the UE should send the CSI reports.

According to the second embodiment, the transmitter 503 is further configured to send a command 605 to the UE to transmit a CSI report wherein the parameter 606 is a time delay defined from reception at the UE of the command 605 to send the CSI report to the transmission of the CSI report 607. Accordingly, the receiver 602 of the UE 600 is further configured to receive the command 605 to transmit a CSI report.

The parameter may also be a UE-specific parameter such as a C-RNTI known both at the base station and at the UE according to a third embodiment.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method in a base station in a Long Term Evolution, LTE, cellular communication network for controlling Channel State Information, CSI, reports to be sent by a User Equipment, UE, wherein the CSI reports are based on measurements on cell specific reference signals from the base station, the method comprising:
   determining an interval/pattern with which the cell specific reference signals should be sent from the base station,
   determining a parameter dependent on the interval/pattern which is indicative of when the UE should send. CSI reports to distribute CSI reports from different UEs,
   sending the parameter to the UE, and
   sending a command to the UE to transmit a CSI report wherein the parameter is a time delay defined from reception at the UE of the command to send the CSI report to the transmission of the CSI report, wherein the parameter that is the time delay is sent to the UE separately from the command to the UE to transmit the CSI report and separately from the cell specific reference signals, and wherein the command to the UE to transmit the CSI report is sent to the UE separately from the cell specific reference signals.

2. The method according to claim 1, wherein the parameter is a transmission pattern indicative of UE transmission of CSI reports.

3. The method according to claim 1 wherein sending the parameter which is a time delay comprises sending individual time delays to a plurality of UEs, and wherein sending the command comprises broadcasting the command to the plurality of UEs.

4. The method according to claim 1 wherein sending the command comprises sending the command as a dedicated request to the UE.

5. The method according to claim 4 wherein sending the parameter which is a time delay comprises including the time delay in the command.

6. The method according to claim 4 wherein sending the command comprises distributing commands to the different UEs to distribute transmission of CSI reports from the different UEs.

7. The method according to claim 6 wherein the parameter which is a time delay is the same for the different UEs.

8. A method in a User Equipment, UE, in a Long Term Evolution, LTE, cellular communication network for sending Channel State Information, CSI, reports, wherein the CSI reports are based on measurements on cell specific reference signals from a base station, and the cell specific reference signals are sent with a predefined interval/pattern, the method comprising:
   using a parameter, wherein the parameter is dependent on the interval/pattern and is indicative of when the UE should send CSI reports, wherein the parameter is received from the base station,
   receiving a command to transmit a CSI report wherein the parameter is a time delay defined from reception at the UE of the command to send the CSI report to the transmission of the CSI report, and
   sending the CSI report responsive to the command according to the time delay,
   wherein the parameter that is the time delay is received by the UE separately from the command to transmit the CSI report and separately from the cell specific reference signals, and wherein the command to transmit the CSI report is received by the UE separately from the cell specific reference signals.

9. The method according to claim 8, wherein the parameter is a transmission pattern for UE transmission of CSI reports.

10. The method according to claim 8 wherein the parameter which is a time delay is received as an individual time delay from the base station, and wherein receiving the command comprises receiving the command as a broadcast from the base station to a plurality of UEs.

11. The method according to claim 8 wherein receiving the command comprises receiving the command as a dedicated request from the base station to the UE.

12. The method according to claim 11 wherein the parameter which is a time delay is included in the command.

13. A base station adapted for a Long Term Evolution, LTE, cellular communication network for controlling Channel State Information, CSI, reports to be sent by a User Equipment, UE, wherein the CSI reports are based on measurements on cell specific reference signals from the base station, the base station comprising:
   a first processing unit configured to determine an interval/pattern with which the cell specific reference signals should be sent from the base station,
   a second processing unit configured to determine a parameter dependent on the interval/pattern which is indicative of when the UE should send CSI reports to distribute CSI reports from different UEs, and
   a transmitter configured to send the parameter to the UE, wherein the transmitter is further configured to send a command to the UE to transmit a CSI report wherein the parameter is a time delay defined from reception at the UE of the command to send the CSI report to the transmission of the CSI report,
   wherein the parameter that is the time delay is sent to the UE separately from the command to the UE to transmit the CSI report and separately from the cell specific reference signals, and wherein the command to the UE to transmit the CSI report is sent to the UE separately from the cell specific reference signals.

14. The base station according to claim 13, wherein the parameter is a transmission pattern indicative of UE transmission of CSI reports.

15. The base station according to claim 13 wherein the transmitter is configured to send individual time delays to a plurality of UEs, and to send the command as a broadcast to the plurality of UEs.

16. The base station according to claim 13 wherein the transmitter is configured to send the command as a dedicated request to the UE.

17. The base station according to claim 16 wherein the transmitter is configured to send the command including the time delay.

18. The base station according to claim 16 wherein the transmitter is configured to distribute commands to the different UEs to distribute transmission of CSI reports from the different UEs.

19. The base station according to claim 18 wherein the parameter which is a time delay is the same for the different UEs.

20. A User Equipment, UE, adapted for a Long Term Evolution, LTE, cellular communication network for sending Channel State Information, CSI, reports, wherein the CSI reports are based on measurements on cell specific reference signals from a base station, and the cell specific reference signals are sent with a predefined interval/pattern, the UE comprising:
   a CSI reporting manager configured to use a parameter, wherein the parameter is dependent on the interval/pattern and is indicative of when the UE should send CSI reports,
   a transmitter configured to send the CSI reports according to the parameter, and
   a receiver configured to receive the parameter from the base station, wherein the receiver is further configured to, receive a command to transmit a CSI report wherein the parameter is a time delay defined from reception at the UE of the command to send the CSI report to the transmission of the CSI report,
   wherein the transmitter is configured to send the CSI res ort responsive to the command according to the time delay, wherein the parameter that is the time delay is received by the UE separately from the command to transmit the CSI report and separately from the cell specific reference signals, and wherein the command to transmit the CSI report is received by the UE separately from the cell specific reference signals.

21. The UE according to claim 20, wherein the parameter is a transmission pattern for UE transmission of CSI reports.

22. The User Equipment according to claim 20 wherein the parameter which is a time delay is received as an individual time delay from the base station, and wherein the command is received as a broadcast from the base station to a plurality of UEs.

23. The User Equipment according to claim 20 wherein the command is received as a dedicated request from the base station to the UE.

24. The User Equipment according to claim 23 wherein the parameter which is a time delay is included in the command.

* * * * *

UNITED STATES PATENT AND TRADEMARK OFFICE
CERTIFICATE OF CORRECTION

| | | |
|---|---|---|
| PATENT NO. | : 8,929,235 B2 | Page 1 of 1 |
| APPLICATION NO. | : 13/379767 | |
| DATED | : January 6, 2015 | |
| INVENTOR(S) | : Baldemair et al. | |

It is certified that error appears in the above-identified patent and that said Letters Patent is hereby corrected as shown below:

On the Title Page, item (60), under "Related U.S. Application Data", in Column 1, Line 2, delete "30, 9." and insert -- 30, 2009. --, therefor.

In the Drawings:

In Fig. 5, Sheet 5 of 5, for Tag "601", in Line 1, delete "parameter" and insert -- reporting --, therefor.

In the Claims:

In Column 5, Line 31, in Claim 1, delete "send." and insert -- send --, therefor.

In Column 8, Line 1, in Claim 20, delete "to, receive" and insert -- to receive --, therefor.

In Column 8, Line 5, in Claim 20, delete "res ort" and insert -- report --, therefor.

Signed and Sealed this
Twenty-eighth Day of July, 2015

Michelle K. Lee
*Director of the United States Patent and Trademark Office*